United States Patent
Wang et al.

(10) Patent No.: US 8,566,542 B1
(45) Date of Patent: Oct. 22, 2013

(54) BACKUP USING STORAGE ARRAY LUN LEVEL SNAPSHOT

(75) Inventors: Juhsun Wang, Santa Clara, CA (US); Jasmeer K. Abdulvahid, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 12/985,893

(22) Filed: Jan. 6, 2011

(51) Int. Cl.
*G06F 12/00* (2006.01)

(52) U.S. Cl.
USPC ............... 711/162; 711/6; 711/114; 711/170

(58) Field of Classification Search
None
See application file for complete search history.

(56) References Cited

U.S. PATENT DOCUMENTS

| 7,356,679 | B1 * | 4/2008 | Le et al. ............................ 713/1 |
| 2008/0270564 | A1 * | 10/2008 | Rangegowda et al. ........ 709/212 |
| 2009/0119538 | A1 * | 5/2009 | Scales et al. ...................... 714/6 |

OTHER PUBLICATIONS

"Using VMware Infrastructure for Backup and Restore," VMware best practices, 2006, pp. 1-20.
"VMware Consolidated Backup," VMware product datasheet, 2009, 2 pages.

* cited by examiner

*Primary Examiner* — Shawn X Gu

(57) ABSTRACT

A method is provided to back up a virtual machine running on a physical host server. The virtual machine has a virtual disk stored on a logical disk (LUN) in a storage array. The method includes creating a backup shadow virtual machine, taking a storage array LUN level snapshot of the LUN, mounting a copy of the virtual disk in the snapshot LUN to the backup shadow virtual machine, mounting the snapshot LUN to a physical backup proxy server, and un-mounting the snapshot LUN from the backup proxy server and the copy of the virtual disk from the backup shadow virtual machine after the backup proxy server backs up the virtual machine to one or more backup storage units.

19 Claims, 3 Drawing Sheets

BACKUP USING STORAGE ARRAY LUN LEVEL SNAPSHOT

FIELD OF INVENTION

This invention relates to a method for backing up virtual machines with reduced impact on the underlying host server.

DESCRIPTION OF RELATED ART

A virtual machine is a software implementation of a machine (i.e. a computer) that executes programs like a physical machine. Multiple virtual machines can run on a virtual machine monitor or hypervisor, which in turn runs on bare hardware (i.e., a physical server) or an operating system. The advantages of virtual machines include the ability to run multiple OS environments on the same computer and the consolidation of applications onto fewer physical servers to save money through reduced hardware, power, cooling and administration costs.

SUMMARY

In one or more embodiment of the present disclosure, a method is provided to back up a virtual machine running on a physical host server. The virtual machine has a virtual disk stored on a logical disk (LUN) in a storage array. The method includes creating a backup shadow virtual machine, taking a storage array LUN level snapshot of the LUN, mounting a copy of the virtual disk in the snapshot LUN to the backup shadow virtual machine, mounting the snapshot LUN to a physical backup proxy server, and un-mounting the snapshot LUN from the backup proxy server and the copy of the virtual disk from the backup shadow virtual machine after the backup proxy server backs up the virtual machine to one or more backup storage units.

BRIEF DESCRIPTION OF THE DRAWINGS

In the drawings.

Use of the same reference numbers in different figures indicates similar or identical elements.

DETAILED DESCRIPTION

VMware®, Inc. is a provider of virtualization software. VMware® vSphere Hypervisor (ESXi) server is a hypervisor that runs on a physical host server for abstracting processor, memory, storage, and networking resources to be provisioned to multiple virtual machines. The ESXi server includes VMware® VMFS file system that stores virtual disk data of virtual machines on physical SCSI disks and partitions, including SAN and iSCSI storage systems. When the VMFS file system takes a VMFS snapshot of a virtual machine, the VMFS file system creates a redo log file and all writes are written to the redo log file while the base disk file becomes static and unchanging. VMware® vStorage APIs for Data Protection is a backup proxy software that enables a third-party backup tool to perform LAN-free backup of virtual machines from a centralized, physical backup proxy server. Integrated with the vStorage APIs for Data Protection on the backup proxy server, the third-party backup tool can directly read virtual disk data of the virtual machines from a SAN storage system using a Fibre Channel or iSCSI connection and back up the virtual machines. This mode of operation is commonly referred to "off-host backup" using a "SAN mode" connection.

One way to backup a virtual machine is to take a VMFS snapshot so the third-party backup tool can read and back up the virtual disk data from the VMFS snapshot to tape or disk. Afterwards the VMFS snapshot is removed to commit and write the changes in the redo log file to the base disk file. However, taking a VMFS snapshot and "rolling back" the VMFS snapshot both impact the performance of the ESXi server and the underlying host server. Thus, what is needed is a way to reduce the performance impact on an ESXi server from backing up virtual machines.

Figure 1:
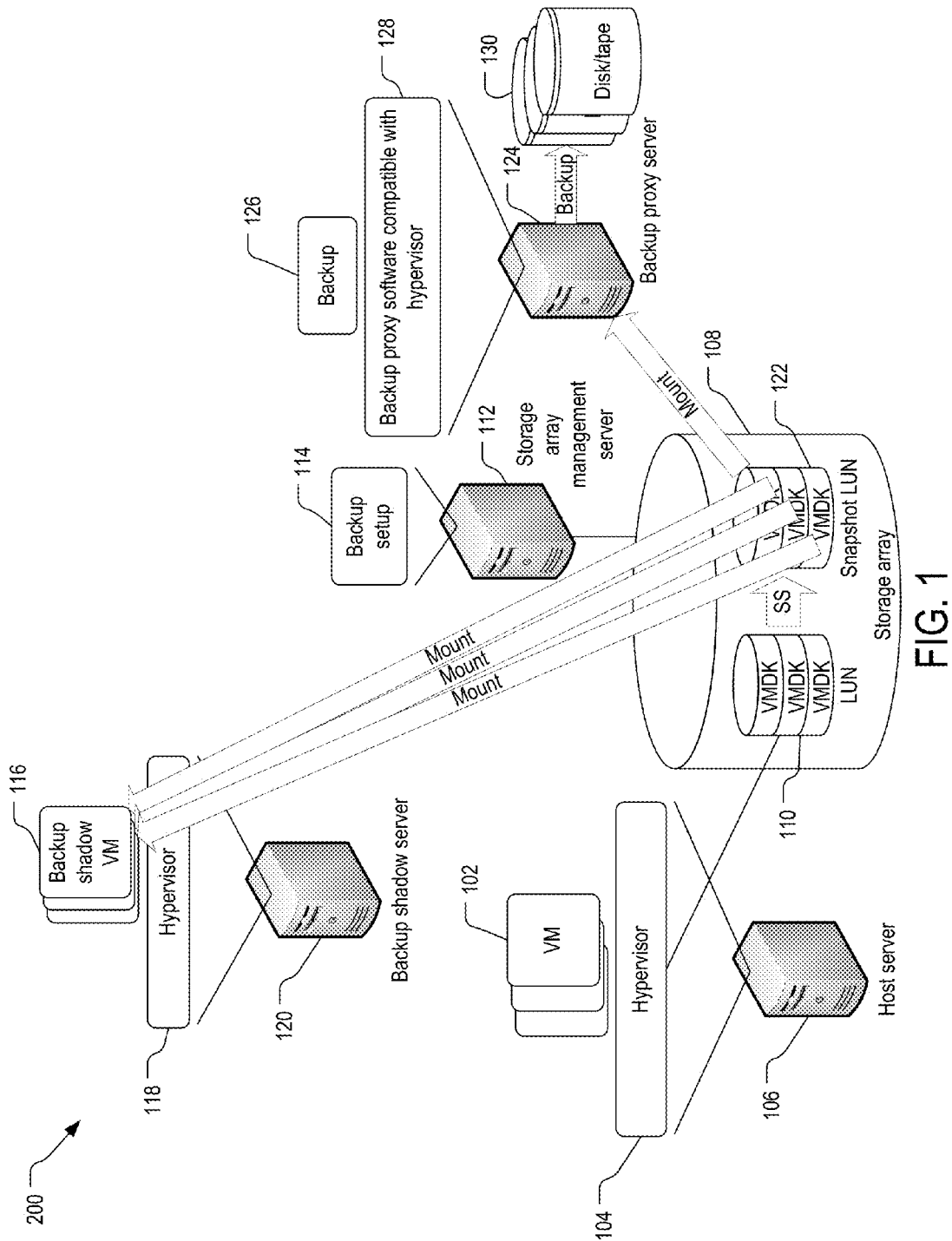
FIG. 1 is block diagram of a system for backing up one or more virtual machines in one or more embodiments of the present disclosure.

FIG. 1 is block diagram of a system 100 for backing up one or more virtual machines 102 in one or more embodiments of the present disclosure. VMs 102 run on a hypervisor 104, which in turn runs on a physical host server 106. Hypervisor 104 may be an ESXi server from VMware®, Inc. of Palo Alto, Calif.

A storage array 108 provisions a logical disk (LUN) 110 to hypervisor 104, which divides the LUN into virtual disks (e.g., VMDKs) mounted to VMs 102. A physical storage array management server 112 is connected to configure and control storage array 108. Backup setup software 114 runs on storage array management server 112 to arrange the off-host backup of VMs 102. Storage array 108 may be a storage system with snapshot software from 3PAR, Inc. of Fremont, Calif. Storage array management server 112 may be a conventional server computer. Although not illustrated, host server 106, backup shadow server 120, and backup proxy serve 124 are connected by Fibre Channel or iSCSI connections to storage array 108. Furthermore, host server 106, storage array management server 112, backup shadow server 120, and backup proxy serve 124 are connected to each other through a LAN.

Storage array management server 112 creates one or more backup shadow VMs 116 on a hypervisor 118, which in runs on a physical backup shadow server 120. Storage array management server 112 may create one backup shadow VM 116 for each VM 102 so all the VMs 102 may be backed up at the same time. Each backup shadow VM 116 is a dummy VM with a basic configuration, or the same configuration as the corresponding VM 102, that allows it to mount to a virtual disk residing on a Fibre Channel or iSCSI SAN and implement the hypervisor's off-host backup mode of operation. Hypervisor 118 may be the same product as hypervisor 104. Instead of running hypervisor 118 on backup shadow server 120, backup shadow VMs 116 may run on hypervisor 104 on host server 106.

Storage array management server 112 takes a storage array LUN level snapshot of LUN 110. The resulting snapshot LUN 122 contains copies of the virtual disks of VMs 102 in LUN 110, which for simplicity are referred to as the virtual disks of VMs 102 in snapshot LUN 122. Storage array management server 112 then mounts the virtual disks of VMs 102 in snapshot LUN 122 to the corresponding backup shadow VMs 116 and the snapshot LUN 122 to a physical backup proxy server 124.

Prior to taking snapshot LUN 122, storage array management server 112 may create VMFS snapshots of VMs 102 to quiesce them, which ensures all pending data changes have been written to the VM's virtual disks. Storage array management server 112 may delete the VMFS snapshots immediately after taking snapshot LUN 122 so there is little roll back as the rollback time is short.

Backup software 126, integrated with backup proxy software 128 running on backup proxy server 124, backs up VMs 102 to one or more backup storage units 130. Backup proxy software 128 is compatible with hypervisors 104 and 118 so that backup proxy server 124 can directly read the virtual disks (e.g., VMDKs) of VMs 102 in snapshot LUN 122 once the virtual disks are mounted to the corresponding backup shadow VMs 116 and the snapshot LUN 122 is mounted to backup proxy server 124. Backup software 126 with backup proxy software 128 may run on backup proxy server 124 or a VM on the server. Backup software 126 may be NetBackup from Symantec of Mountain View, Calif., Backup from Veeam of Columbus, Ohio, or Simpana from CommVault of Oceanport, N.J. Backup proxy software 128 may be vStorage API for Data Protection from VMware® of Palo Alto, Calif.

In one or more embodiments, storage array management server 112, backup shadow server 120, and backup proxy server 124 may be implemented in the same computer running their respective software. In one or more other embodiments, host server 106, storage array management server 112, and backup shadow server 120 may be implemented in the same computer running their respective software.

As described, a framework is established to backup VMs by using the snapshot mechanism in the storage array. Furthermore, the hypervisor is not excessively burdened with creating and rolling back snapshots. In addition, backup shadow VMs for other hypervisors may be consolidated on a single backup shadow server.

Figure 2:
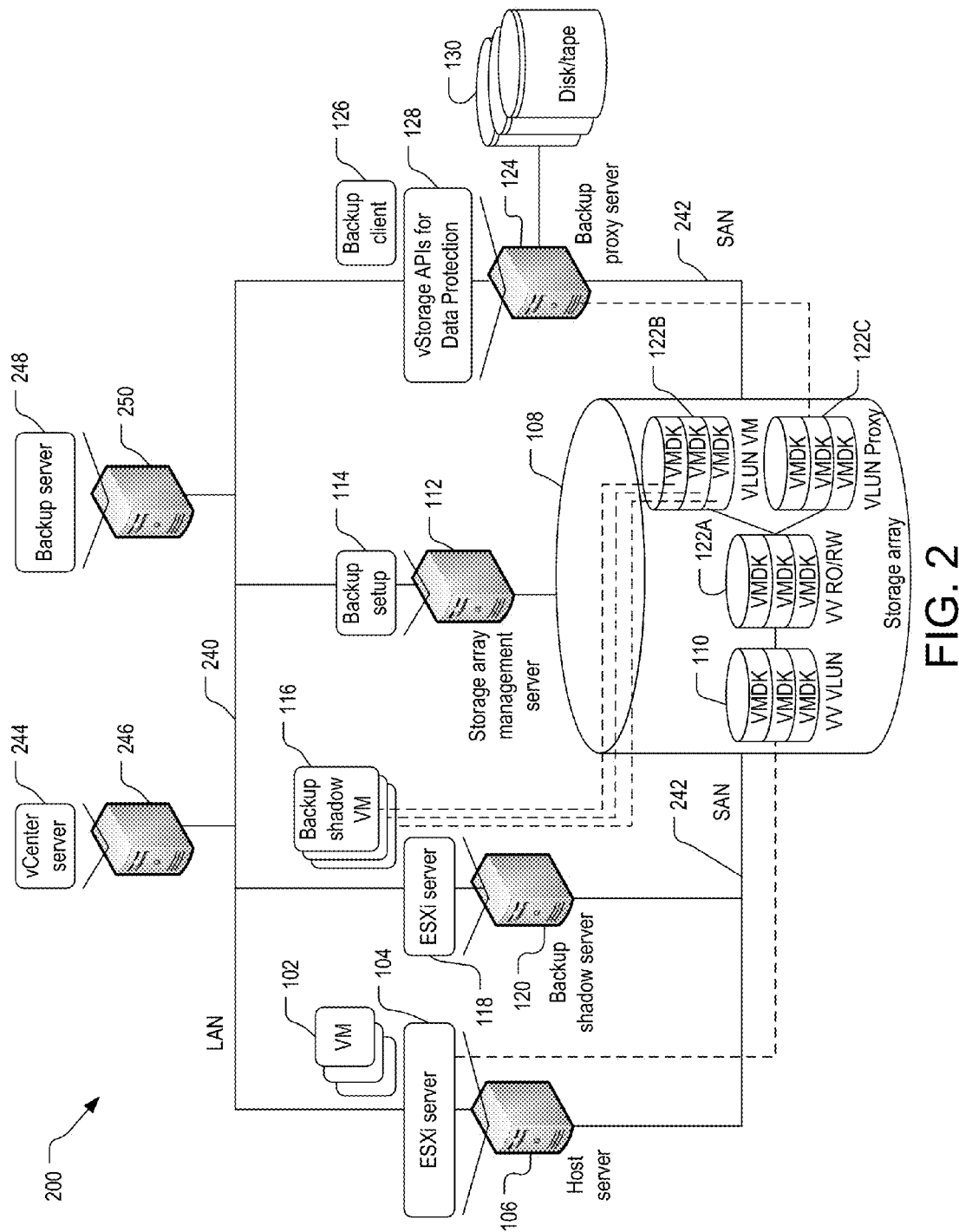
FIG. 2 is a block diagram of an implementation of the system of FIG. 1 in one or more embodiments of the present disclosure.

FIG. 2 is a block diagram of a system 200, an implementation of system 100, in one or more embodiments of the present disclosure. In system 200, host server 106, storage array management server 112, backup proxy server 120, and backup proxy server 124 are connected to each other through a LAN 240. Host server 106, backup proxy server 120, and backup proxy server 124 are to storage array 108 through a SAN 242 utilizing Fibre Channel or iSCSI.

System 200 may include virtualization management software 244 on a physical server 246, and backup server software 248 on a physical server 250. Virtualization management software 244 may reside in a VM. Storage array management server 112 uses virtualization management software 244 to configure and control ESXi servers 104 and 118, including creating backup shadow VMs, taking VMFS snapshots, scan hardware for new LUNs, attaching virtual disks to VMs, and un-mounting LUNs. Virtualization management software 244 may be VMware® vCenter™ Server from VMware® of Palo Alto, Calif. Backup server software 248 can determine when backup client software 126 is to back up VMs 102. Backup server software 248 and backup client software 126 may be NetBackup from Symantec of Mountain View, Calif. Servers 246 and 250 may be connected to the other servers through LAN 240. Servers 246 and 250 may be conventional server computers.

When storage array 108 is a 3PAR storage system, the storage array may provision a virtual volume (VV) virtual LUN (VLUN) 110 to ESXi server 104. In the snapshot process, storage array 108 may create a read only or read/write snapshot 122A of VLUN 110, a copy 122B of snapshot 122A with virtual disks to be mounted to backup shadow VMs 116, and a copy 122C of snapshot 122A to be mounted to backup proxy server 124. Creating copies of the base snapshot prevents any corruption of the base snapshot from server access. Snapshots 122A and copies 122B, 122C may also be VV VLUNs.

Figure 3:
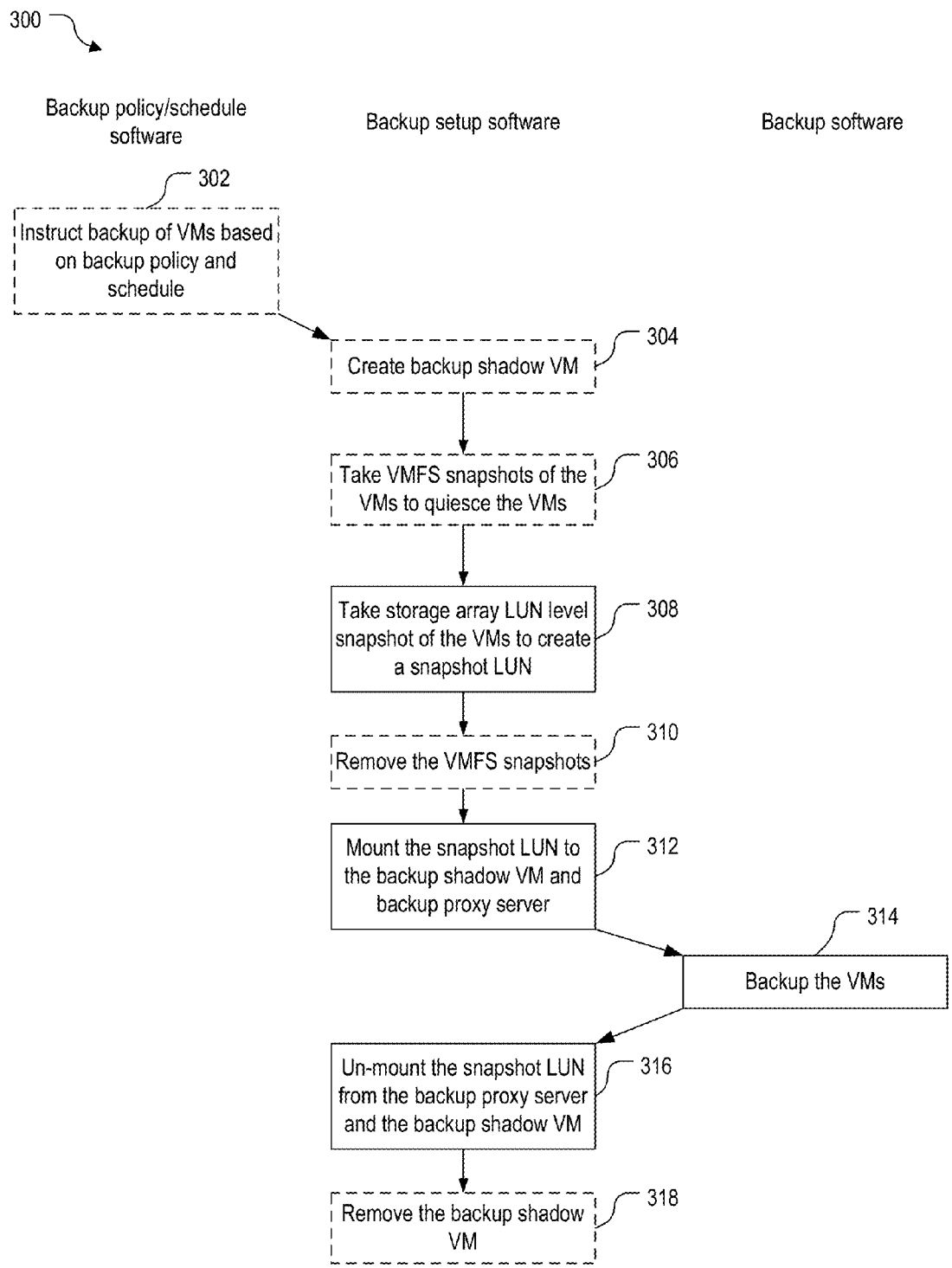
FIG. 3 is a flowchart of a method for backing up virtual machines of FIG. 1 or 2 in one or more embodiment of the present disclosure.

FIG. 3 is a flowchart of a method 300 for backing up VMs 102 in one or more embodiment of the present disclosure. Although blocks of method 300 are illustrated in a sequential order, these blocks may also be performed in parallel, and/or in a different order than those described herein. Also, the various blocks may be combined into fewer blocks, divided into additional blocks, and/or eliminated based upon the desired implementation. Method 300 may begin in block 302.

In optional block 302, server 250, executing backup server software 248, determines it is time to back up VMs 102 and instructs storage array management server 112 to start the backup process. This may be based on some backup policy or schedule implemented through backup server software 248.

In optional block 304, storage array management server 112, executing backup setup software 114, instructs or otherwise causes ESXi server 118 creates backup shadow VMs 116 on ESXi server 118. As discussed above, each backup shadow VM 116 is a dummy VM with a basic configuration, or the same configuration as the corresponding VM 102, that allows it to mount to a virtual disk in snapshot LUN 122 (or copy 122B) and implement the hypervisor's off-host backup mode of operation. Block 304 is optional because backup shadow VMs 116 may already exist from a previous pass through the backup process or be created by another entity. As an alternative described above, storage array management server 112 may create backup shadow VMs 116 on ESXi server 104.

In optional block 306, storage array management server 112 instructs or otherwise causes ESXi server 104 to create VMFS snapshots of VMs 102 to quiesce the VMs. Creating the VMFS snapshots ensures all pending data changes have been written to the VM's virtual disks.

In block 308, storage array management server 112 instructs or otherwise causes storage array 108 to create a storage array LUN level snapshot of VMs 102. Specifically, storage array management server 112 instructs or otherwise causes storage array 108 to create snapshot LUN 122 (or snapshot 122A with copies 122B and 122C) of LUN 110 that contains the virtual disks of VMs 102.

In optional block 310, storage array management server 112 instructs or otherwise causes ESXi server 104 to remove the VMFS snapshots of VMs 102 and roll back any data in the redo log files to the base disk files. The roll back process should not impact the performance of ESXi server 104 as little data would have been written to the redo log files in a short time span.

In block 312, storage array management server 112 instructs or otherwise causes ESXi server 118 to mount the virtual disks of VMs 102 in snapshot LUN 122 (or copy 122B) to the corresponding backup shadow VMs 116. Storage array management server 112 may have to first find the proper virtual disks to mount to backup shadow VMs 116 through ESXi server 118 or vCenter server 244. Storage array management server 112 also instructs or otherwise causes backup proxy server 124 to mount snapshot LUN 122 (or copy 122C). As an alternative described above, storage array management server 112 may instruct or cause a hypervisor on backup proxy server 124 to mount snapshot LUN 122 (or copy 122C) to a virtual machine on the hypervisor. Storage array management server 112 may prompt backup proxy server 124 to start the backup of VMs 102.

In block 314, backup client software 126 with vStorage APIs for Data Protection 128 on backup proxy server 124 backs up VMs 102 to backup storage units 130. As described above, by utilizing the off-host backup with SAN mode connection, backup proxy server 124 is able to directly read the virtual disks of VMs 102 from snapshot LUN 122 (or copy 122C) in storage array 108. Backup proxy server 124 may prompt storage array management server 112 once the backup is complete.

In block 316, storage array management server 112 instructs or otherwise causes backup proxy server 124 to un-mount snapshot LUN 122 (or copy 122C) and ESXi server 118 to un-mount the virtual disks in snapshot LUN 122 (or copy 122B) from backup shadow VMs 116.

In optional block 318, storage array management server 112 removes backup shadow VMs 116. Alternatively backup shadow VMs 116 remain and are used again in the next backup process.

Various other adaptations and combinations of features of the embodiments disclosed are within the scope of the present disclosure. Although not shown, the skilled person understands that software may be stored on non-transitory, computer-readable storage media and loaded into system memory for execution by the processors in the server computers. Numerous embodiments are encompassed by the following claims.

What is claimed is:

1. A method to back up a virtual machine running on a physical host server, a virtual disk of the virtual machine being stored on a logical disk (LUN) provisioned by a storage array, the method comprising:
    taking a snapshot of the LUN in the storage array to create a snapshot LUN, the snapshot LUN comprising a copy of the virtual disk;
    mounting the copy of the virtual disk to a backup shadow virtual machine;
    mounting the snapshot LUN to a physical backup proxy server; and
    un-mounting the snapshot LUN from the backup proxy server and the copy of the virtual disk from the backup shadow virtual machine after the backup proxy server backs up the copy of the virtual disk to one or more backup storage units.

2. The method of claim 1, further comprising creating the backup shadow virtual machine.

3. The method of claim 2, wherein creating the backup shadow virtual machine comprises creating the backup shadow virtual machine on a physical backup shadow server distinct from the host server.

4. The method of claim 2, wherein creating the backup shadow virtual machine comprises creating the backup shadow virtual machine on the host server.

5. The method of claim 1, wherein the backup shadow virtual machine has a basic configuration that allows it to mount the copy of the virtual disk and implement off-host backup with a Storage Area Network (SANS mode connection.

6. The method of claim 1, wherein the backup shadow virtual machine has the same configuration as the virtual machine.

7. The method of claim 1, further comprising searching for the copy of the virtual disk in the snapshot LUN prior to mounting the copy of the virtual disk to the backup shadow virtual machine.

8. The method of claim 1, further comprising:
    prior to taking the snapshot of the LUN in the storage array, taking a virtual machine file system snapshot of the virtual machine to quiesce the virtual machine; and
    after taking the snapshot of the LUN in the storage array, removing the virtual machine file system snapshot.

9. A system, comprising:
    a physical host server executing a virtual machine;
    a physical backup shadow server executing a backup shadow virtual machine;
    a storage array, comprising:
        a logical disk (LUN) comprising a virtual disk mounted to the virtual machine; and
        a snapshot LUN of the LUN, the snapshot LUN comprising a copy of the virtual disk, the copy of the virtual disk being mounted to the backup shadow virtual machine; and
    a physical backup proxy server executing a backup proxy software, the snapshot LUN being mounted to the backup proxy server, the backup proxy software enabling the backup proxy server to directly read and back up the copy of the virtual disk in the snapshot LUN.

10. The system of claim 9, further comprising a storage array management server executing a backup setup software that causes a creation of the backup shadow virtual machine, a taking of the snapshot LUN of the LUN, the mounting of the copy of the virtual disk to the backup shadow virtual machine, and the mounting of the snapshot LUN to the backup proxy server.

11. The system of claim 10, wherein the LUN further comprises a virtual machine file system snapshot of the virtual machine, and the backup setup software further causes a creation of the virtual machine file system snapshot prior to the taking of the snapshot LUN.

12. The system of claim 10, further comprising a physical server executing a virtual machine management software for a first hypervisor on the host server and a second hypervisor on the backup shadow server, the virtual machine management software performing the creation of the backup shadow virtual machine, the mounting of the copy of the virtual disk to the backup shadow virtual machine, and the mounting of the snapshot LUN to the backup proxy server.

13. The system of claim 12, further comprising another physical server executing a backup software that causes the backup setup software to start backing up the virtual machine.

14. The system of claim 9, wherein the backup proxy server further executes a backup setup software that causes a creation of the backup shadow virtual machine, a taking of the snapshot LUN of the LUN, the mounting of the copy of the virtual disk to the backup shadow virtual machine, and the mounting of the snapshot LUN to the backup proxy server.

15. The system of claim 14, wherein the LUN further comprises a virtual machine file system snapshot of the virtual machine, and the backup setup software further causes a creation of the virtual machine file system snapshot prior to the taking of the snapshot LUN.

16. The system of claim 14, further comprising a physical server executing a virtual machine management software for a first hypervisor on the host server and a second hypervisor on the backup shadow server, the virtual machine management software performing the creation of the backup shadow virtual machine, the mounting of the copy of the virtual disk to the backup shadow virtual machine, and the mounting of the snapshot LUN to the backup proxy server.

17. The system of claim 16, further comprising another physical server executing a backup software that causes the backup setup software to start backing up the virtual machine.

18. A system, comprising:
    a physical host server executing a virtual machine;
    a storage array, comprising:
        a logical disk (LUN) comprising a virtual disk mounted to the virtual machine; and a snapshot LUN of the LUN, the snapshot LUN comprising a copy of the virtual disk; and a physical backup server executing a backup shadow virtual machine and a backup proxy software, the copy of the virtual disk being mounted to the backup shadow virtual machine, the snapshot LUN being mounted to the backup server, the backup proxy software enabling the backup server to directly read and back up the copy of the virtual disk in the snapshot LUN.

19. A system, comprising:

a physical host server executing a virtual machine and a backup shadow virtual machine;

a storage array, comprising:
- a logical disk (LUN) comprising a virtual disk mounted to the virtual machine; and
- a snapshot LUN of the LUN, the snapshot LUN comprising a copy of the virtual disk, the copy of the virtual disk being mounted to the backup shadow virtual machine; and a physical backup proxy server executing a backup proxy software, the snapshot LUN being mounted to the backup proxy server, the backup proxy software enabling the backup proxy server to directly read and back up the copy of the virtual disk in the snapshot LUN.

* * * * *

UNITED STATES PATENT AND TRADEMARK OFFICE
CERTIFICATE OF CORRECTION

PATENT NO. : 8,566,542 B1
APPLICATION NO. : 12/985893
DATED : October 22, 2013
INVENTOR(S) : Juhsun Wang et al.

Page 1 of 1

It is certified that error appears in the above-identified patent and that said Letters Patent is hereby corrected as shown below:

In the Claims:

In column 5, line 53, in Claim 5, delete "(SANS" and insert -- (SAN) --, therefor.

Signed and Sealed this
Eleventh Day of February, 2014

Michelle K. Lee
*Deputy Director of the United States Patent and Trademark Office*